Figure 1:
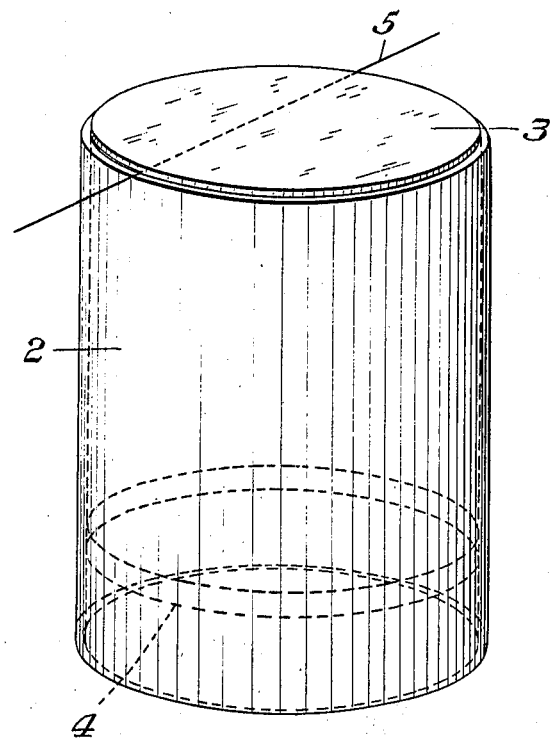

Aug. 9, 1932.  A. F. WARD  1,870,882
MAKING PIE CRUST
Filed Jan. 11, 1929

INVENTOR
Ashley F. Ward
by his attorneys
Byrnes, Stebbins & Parmelee.

Patented Aug. 9, 1932

1,870,882

UNITED STATES PATENT OFFICE

ASHLEY F. WARD, OF CINCINNATI, OHIO, ASSIGNOR TO ASHLEY F. WARD, INC., OF CINCINNATI, OHIO, A CORPORATION OF OHIO

MAKING PIE CRUST

Application filed January 11, 1929. Serial No. 331,819.

The present invention relates to the making of pie crust, and more especially to the making of a superior flaky crust.

It has been well recognized that flakiness of pie crust is a particularly desirable quality and one which housewives and pie bakers strive to attain. The pie crust also should have tenderness or shortness as contrasted with a tough crust.

These desirable qualities have heretofore beeen difficult, if not impossible, to attain to the full extent desired, because of the manner in which the pie crust has been formed from the pie dough.

Pie dough usually consists of four ingredients, namely, flour, salt, shortening and water. Pie dough differs from bread dough in that it is not a rising dough. Sometimes a small amount of baking powder is added to pie dough, but the amount added is not sufficient to make it a rising dough, and the baking powder has a tendency to make the crust mealy. Therefore, the universally used ingredients of pie dough are those mentioned above, namely, flour, salt, shortening and water.

In the making of pie dough the careful cook endeavors to work the shortening and water into the dough so as to compact the dough as little as possible. However, when the dough is formed into pie crust, the universal custom has been to roll out the pie dough to form the thin crust.

The rolling of the pie dough to form the crust inevitably results in the compacting of the dough. The more the dough is compacted during the rolling-out operation, the more the desirable flakiness of the crust is reduced. In order to minimize the undesirable effect of the rolling, the careful housewife does not work or roll the pie dough any more than is necessary. The evil effect of the rolling is also shown by the use to which the baker is compelled to make of the trimmings cut from the edge of the crust when it is applied to the pie. In the commercial pie bakeries the upper crust is usually of better quality than the lower crust. However, it is found that if an attempt be made to reroll the upper crust trimmings, they will not make as satisfactory an upper crust as the original material, this being due, I believe, to the deleterious effect of the reworking and rerolling of the upper crust material. Consequently, the baker has to take the upper crust trimmings and use them with the lower crust pie dough, this representing a considerable waste of the higher priced material.

I have overcome the difficulties which have resulted from the rolling-out operation and have produced a superior pie crust by forming the crust from the dough without compacting it. This is preferably done, as hereinafter more fully described, by first forming a cylindrical mass of dough of the required size and then slicing or cutting from such mass of dough the sheets of crust ready to be applied to the pies.

In the drawing,—

Figure 2:

Figure 1 is a diagrammatic perspective view illustrating the preferred method of slicing off the sheets of pie dough; and Figure 2 is a view of a sheet of pie dough thus cut off and ready for use as a pie crust.

In making the pie crust I preferably follow the usual pie dough recipes, the improvement in the product being primarily due to the process of making the pie crust rather than in the ingredients. I therefore use the usual pastry flour, salt, shortening and water.

The various ingredients are preferably chilled well below the normal room temperatures, say, to temperatures in the neighborhood of 40° to 50° Fahrenheit. The flour and salt are first mixed, as is the usual practice. Then the shortening and water are worked into the flour in the usual way, care being taken to work the dough no more than necessary to get the proper distribution of the shortening and water therein.

These operations are preferably carried out with the materials chilled, as this contributes to the desirable qualities of the pie crust. The shortening, which may be lard or the various hydrogenated cotton-seed oil products sold under various trade names, is solid and fairly stiff when it is chilled. If it is worked into the flour in the solidified state, the doughy mass is not compacted but retains a more open porous condition. The solidified shortening apparently exists in the dough as small segregated particles of shortening and does not tend to wet the flour or to displace the air, as is the case when the mass is at a temperature sufficient to melt or soften the shortening so that it can flow. After the mass of pie dough has been thus formed, it is preferably formed into a cylindrical shape of a cross-section equal to the size of the pie crust desired.

The pie dough as thus molded into the desired shape is then preferably placed in a refrigerator and chilled, preferably to a temperature of 40° Fahrenheit or below, so that the mass is hard and stiff. The individual pie crusts are then sliced or cut from such chilled mass. The mass can be stiffened by chilling to a point where it could not be satisfactorily rolled out, although the pie crust can be readily sliced from it in such condition.

The chilling of the mass of dough from which the pie crusts are sliced gives a stiff consistency so that the cutting operation can be readily performed. The chilling also holds the shortening in a congealed non-wetting condition so that the cutting operation does not tend to compact the slices of crust as they are cut from the mass.

The result is that a light open crust containing the maximum amount of air is formed initially. Upon baking the pie this results in a flaky, tender crust. Apparently the air which is retained in the crust owing to the fact that it is not subjected to a compacting operation, such as rolling, keeps the crust light and fluffy. The result is that the crust in the completed pie has to the highest extent the universally recognized desirable qualities of flakiness, tenderness and crispness.

In the drawing I have illustrated diagrammatically the preferred method of slicing off the crust from the mass of dough. In such illustrated embodiment of the drawing, a metal can or container 2 is filled with a mass of dough 3 which is molded thereby into the cylindrical form as shown. The container 2 with the mass of dough 3 is put into a refrigerator and chilled. After the dough is chilled, the individual round pie crust may be readily sliced therefrom. The container has a movable bottom 4 which may be gradually pushed up to extrude the mass of dough 3 from the top of the container. The dough may be sliced off in sheets as it is extruded from the top of the container by any suitable cutting mechanism or knife. In the illustrated embodiment a wire 5 is shown as the cutter. In Figure 2 there is illustrated one of the complete round pie crusts 6 as cut from the mass of dough.

A wire-like cutter is preferred for slicing off the crusts from the mass of dough. The cutter wire may be a round wire, or it may be a ribbon wire. The expression "wire" or "wire-like" cutter is intended to define a cutter of the character of a round wire or a flat ribbon wire, having a short cutting blade so as not to expose any extended cheek or surface to drag against the dough, as would be the case with the ordinary knife blade.

The mass of dough is preferably formed of the same diameter as that desired for the pie crust, thus minimizing, if not entirely eliminating, the trimming of the edges of the pies and the reworking and relegating of the reworked trimmings of the inferior class of pie dough.

It will be understood that the showing in the drawing is diagrammatic and that machinery can be readily adapted for extruding and cutting off the slices of pie crust in commercial establishments.

While I have described in detail the various steps in my method of making pie crust, it is to be understood that the invention is not so limited but may be otherwise embodied and practiced within the scope of the following claims.

I claim:

1. The method of making pie crusts, which comprises forming a mass of pie dough in an open porous condition and chilled to a stiffness at which the dough cannot be satisfactorily rolled but at which it can be cut, and slicing from such chilled mass of dough pie crusts of a thinness suitable for use in pies and without subjecting the dought to compacting pressure, so as to thereby retain the open porous condition of the dough in the completed pie crusts.

2. The method of making pie crusts, which comprises forming a mass of pie dough in a chilled open porous condition, and forming a pie crust of a thinness suitable for use in the pie by slicing it from such chilled mass and without subjecting the dough to compacting pressure and thereby retaining the open porous condition of the dough in the completed pie crust.

3. The method of making pie crusts, which comprises forming a mass of pie dough in a chilled open porous condition, and forming a pie crust of a thinness suitable for use in the pie by slicing it from such chilled mass by means of a wire-like cutter and without subjecting the dough to compacting pressure and thereby retaining the open porous condition of the dough in the completed pie crust.

4. The method of making pie crusts, which comprises mixing together the pie dough ingredients including the shortening in a congealed condition and forming a mass of pie dough, and while such mass is chilled so as to retain the shortening in a congealed condition, slicing therefrom pie crusts of a size and thinness suitable for use in pies and without subjecting the dough to compacting pressure.

In testimony whereof I have hereunto set my hand.

ASHLEY F. WARD.